PULSE SHAPING CIRCUIT EMPLOYING TIMING PULSES AND REGENERATIVE FEEDBACK TO EFFECT SHAPING

Filed June 5, 1961

INVENTORS
BRIAN JAMES HOLMES, RAYMOND MICHAEL LLOYD
IGNACY KRAJEWSKI, GEOFFREY JOHN PARKER
MICHAEL LAUGHARNE NEVILLE FORREST

By Hane and Nydick
ATTORNEYS

United States Patent Office
3,103,602
Patented Sept. 10, 1963

3,103,602
PULSE SHAPING CIRCUIT EMPLOYING TIMING PULSES AND REGENERATIVE FEEDBACK TO EFFECT SHAPING

Brian James Holmes, Stevenage, Raymond Michael Lloyd, Congleton, and Ignacy Krajewski, Hitchin, England, Geoffrey John Parker, Ryde, New South Wales, Australia, and Michael Laugharne Neville Forrest, Baldock, England, assignors to International Computers and Tabulators Limited, London, England Filed June 5, 1961, Ser. No. 114,702
Claims priority, application Great Britain June 29, 1960
3 Claims. (Cl. 307—88.5)

This invention relates to electrical circuits employing transistors. The object of the invention is to provide improved transistor circuits for amplifying and re-shaping pulse signals.

According to the invention a pulse amplifying and re-shaping circuit includes a transistor with emitter, base and collector electrodes, means for biasing the transistor to a normally non-conducting condition, a signal gating circuit connected to the base of the transistor and responsive to input and timing pulses to cause the transistor to conduct, an output signal load circuit connected to the collector of the transistor, and a positive signal feedback circuit connected between the load circuit and the base of the transistor.

Non-linear resistance devices may be connected to the emitter and/or the collector of the transistor to prevent overloading of the transistor.

The amplifying circuit may receive input pulses from one or more delay lines, with a clamping diode connected to limit the potential at the input of the amplifier, irrespective of the current supplied by the delay lines.

A further source of timing pulses may be applied to the input of the amplifier with a phase different from that of the first timing pulses to prevent the generation of spurious output pulses.

The feedback circuit is preferably such that conduction of the transistor is maintained, under control of the timing pulses, after termination of an input signal pulse.

Means may be provided operable to limit the amplitude of the signal across the output load circuit to a predetermined level.

A pulse amplifying and re-shaping circuit according to the invention is intended for use in performing logical operations in a computer and especially in a construction of computer comprising a number of identical or similar basic units connected together in such manner as to perform the logical operations. The units where desired may be interconnected by means of delay lines.

Figure 1:
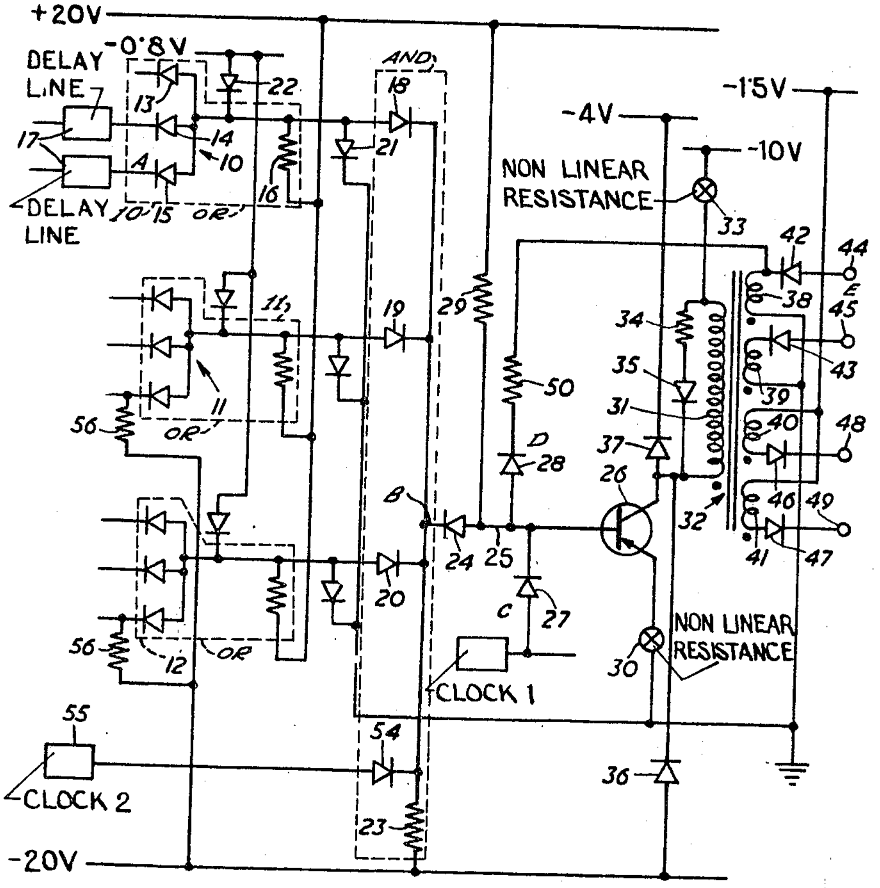
Figures 2, 3:
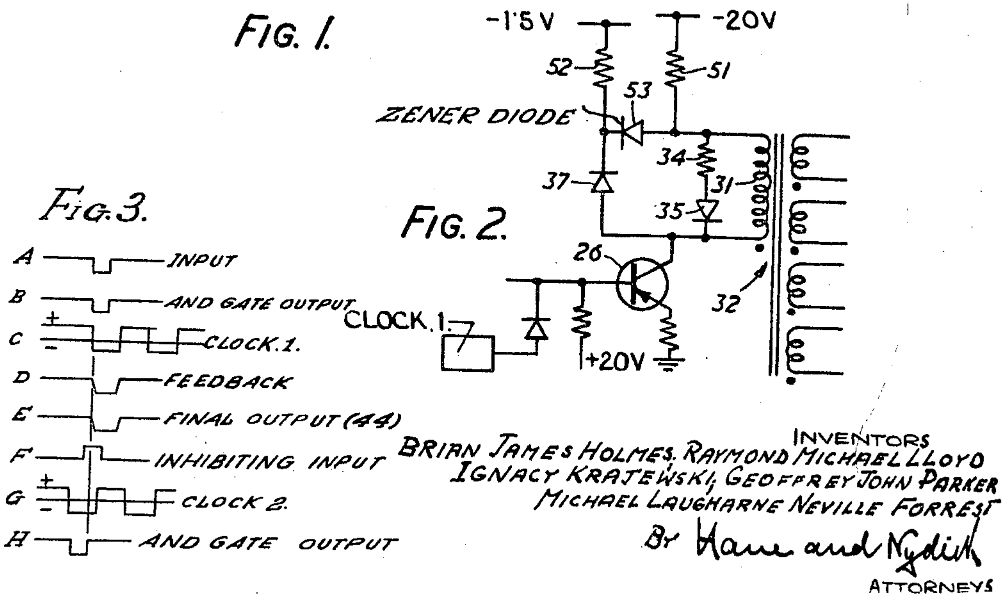

The invention will be described hereinafter in more detail with reference by way of example to the accompanying drawings in which, FIGURE 1 is a diagram of an electrical pulse amplifying and re-shaping circuit, and FIGURE 2 shows a modification of part of the circuit of FIGURE 1, and FIGURE 3 shows idealised waveforms representative of electrical pulses.

The circuit includes three "OR" gates 10, 11, 12, and since the three gates are arranged and operate in the same manner only gate 10 will be described in detail. "OR" gate 10 comprises three diodes 13, 14, 15 with their anodes connected together and connected through a resistor 16 to a +20 v. supply.

Input signals consisting of trains of pulses representing values may be applied to the cathodes of one or more of the diodes 13, 14, 15. In the present example inputs are shown to diodes 14, 15 through delay lines 17.

The anodes of the diodes 13, 14, 15 of OR gate 10 are connected to the anode of diode 18 forming one input to an AND gate. The AND gate includes further input diodes 19, 20, to which OR gates 11, 12 respectively are connected in a similar manner.

The anodes of the diodes 13, 14, 15 are prevented from going substantially positive by a zero level clamp diode 21 connected to ground. A further clamp diode 22 is connected between the anodes of diodes 13, 14, 15 and −.8 v. supply to prevent the anodes falling below about −1.3 v. as may otherwise occur when more than one delay line terminates on the OR gate. Similar clamp diodes are provided for the other OR gates 11 and 12.

The cathode of the diodes 18, 19, 20 of the AND gate are connected together and connected through a resistor 23 to a −20 v. supply. The cathodes of diodes 18, 19, 20 are connected also to the cathode of a diode 24. The anode of diode 24 is connected by line 25 to the base of a transistor 26. The cathode of a diode 27 and the anode of a diode 28 also are connected to line 25 and hence to the base of the transistor. Diode 27 serves to apply timing signals from a supply designated CLOCK 1 and diode 28 is connected in a feedback path described below. The common connection of diodes 24, 27 and 28 is connected through a resistor 29 to the +20 v. supply.

The emitter of transistor 26 is connected to ground through a protective current limiting device 30 such as the filament of an incandescent lamp as shown in FIGURE 1.

The collector of the transistor is connected through the primary winding 31 of an output transformer 32 and a protective current limiting device 33 in series therewith to a −10 v. supply. A damping resistor 34 is connected in series with a diode 35 across the primary winding 31.

The collector of the transistor is also connected through a diode 36 to the −20 v. supply in order to clip negative going excursions of the collector at −20 v. and the collector is connected through a diode 37 to a −4 v. supply to maintain the output at a constant amplitude.

The transformer 32 has four secondary windings 38, 39, 40, 41. The windings 38, 39 are connected in the same sense with one end of each winding earthed and the other ends connected respectively through diodes 42, 43 to output terminals 44, 45. Windings 40, 41 are connected in the opposite sense to windings 38, 39 with one end of each winding connected to a −1.5 v. supply and the other ends connected respectively through diodes 46, 47 to output terminals 48, 49.

The windings of transformer 32 have turns ratios such that an output of 2 v. amplitude is delivered on terminals 44, 48 and an output of 2.7 v. amplitude is delivered on terminals 45, 49.

A positive feedback path is provided from the live end of secondary winding 38 through a resistor 50 and the feedback diode 28 to the base of the transistor.

The operation of the circuits is as follows. When a negative pulse, for example representing a digit input of binary 1 is applied to one or more of the inputs of OR gate 10 the potential at the anodes of diodes 13, 14, 15 falls and cuts off diode 21. A digit input pulse of this kind is shown in idealised form at line A of FIGURE 3. The point in the circuit at which this waveform occurs is indicated by the similar reference A in FIGURE 1. The potential at the diode anodes is prevented from falling below −1.3 v. by clamp diode 22. In addition the fall of potential causes diode 18 to be cut off.

If similar inputs are applied to both the other OR gates 11 and 12 all the diodes 18, 19 and 20 will be cut off thereby opening the AND gate and allowing the potential at the common cathodes to move negatively under influence of resistor 23 and the −20 v. supply. This enables a current of approximately 2 ma. to flow through diode 24 either to the base of the transistor 26 or to the source of CLOCK signals dependent on the polarity of the clock signal input. This current pulse is indicated at B on FIGURES 1 and 3. If the clock signal is positive the current flows to the source of the clock signals and if it is negative the current flows to the base of transistor 26. The relative timing of these clock pulses is indicated at C. A small proportion of the current flows through resistor 29, which resistor serves to supply reverse base current associated with the transistor leakage current under conditions when the AND gate is unopened.

When the above mentioned current flows to the base of the transistor 26, current flows in the collector circuit and the collector voltage changes from —10 v., when the transistor 26 is cut off, to approximately —4 v., the collector being held by diode 37 at the latter potential thus standardising the output pulse amplitude. The pulse of current in the primary winding 31 of the transformer appears as a negative going normal output pulse on terminals 44, 45 and as a positive going inverse output pulse on terminals 48, 49. The pulse at terminal 44, for example, is indicated at E in FIGURES 1 and 3. The pulse in secondary winding 38 causes conduction of the feedback diode 28 and current through the latter into the base of transistor 26 maintains conduction of the transistor, even after collapse of the input, until the clock signal goes positive. This feedback pulse is indicated at D in FIGURES 1 and 3. When the conduction of transistor 26 is terminated by the clock signal going positive the collector potential swings negative and is clipped at —20 v. by diode 36. The diode 35 in series with damping resistor 34 conducts to extract energy from the transformer, the resistor 34, being of such a value as to critically damp the transformer. The diodes 42, 43, 46, 47, in series with the secondary windings are nonconductive during the negative swing of the collector thereby clipping the output waveform delivered to the output terminals. These diodes isolate the stray capacities, due to connections made to the output terminals, from the transformer during the negative swing of the collector thereby allowing a rapid recovery of the circuit. The circuit above described produces an output pulse when there is at least one pulse input to each OR gate 10, 11 and 12 to open the AND gate, the timing of the leading edge of the pulse being dependent upon the instant at which the clock signal goes negative and the timing of the lagging edge of the pulse being dependent upon the instant at which the clock signal goes positive.

It will be appreciated that the circuit described produces an output pulse only when there are pulse inputs to each of the OR gates 10, 11, 12. Since the circuit is intended to be a basic unit, which may be connected in a number of different configurations to carry out different logical operations, in some instances, one or two of the three OR gates may be redundant and have no inputs thereto.

Any unused OR gates may be maintained in an open state by applying a D.C. potential to an input thereof. Thus as shown in FIGURE 1 for example the gates 11 and 12 are maintained in an open state by connecting the cathode of a diode of each gate 11, 12, to the —20 v. supply through resistors 56. The diodes 19, 20 of the AND gate are therefore cut off and the AND gate can be opened by an input pulse to one or more of the diodes 13, 14, 15 of OR gate 10. Alternatively the connections to those inputs of the AND gate may be broken, for instance by a removable link.

The circuit shown in FIGURE 2 embodies a modified collector circuit and may replace that part of the circuit of FIGURE 1 located between the transformer 32 and the line 25.

In the modification the collector is connected through the primary winding 31 of transformer 32 and a resistor 51, in series therewith to the —20 v. supply. The diode 37 is connected through a resistor 52 to the —1.5 v. supply.

A zener diode 53 is conected from the junction of diode 37 and the resistor 52 to the junction of primary winding 31 and resistor 51. The resistor 51, diode 53 and resistor 52 form a voltage dividing chain between the —20 v. and —1.5 v. supplies to hold the collector of transistor 26 at a steady potential of approximately —12 v. when the transistor is non-conducting. The zener diode 53 maintains a potential difference of 6 v. between the resistor 51 and resistor 52 and thus positive going excursions across the transformer primary are limited by diode 37 thereby stabilising the pulse amplitude at 6 v. and limiting the collector current.

When the base of the transistor is driven negative by input signals the collector draws current through the primary winding 31 and the resistor 51 thereby producing a potential difference across the transformer primary winding 31 and simultaneously increasing the voltage drop across resistor 51.

If the potential difference across the primary winding 31 exceeds 6 v. the diode 37 conducts and thereby couples the zener diode across the primary winding 31 to prevent further rise of the potential across the primary 31. In consequence the pulse at the output terminals is limited to a constant amplitude. Also if the collector voltage goes positive relative to —1.5 v. diode 37 conducts to clamp the collector voltage and thus prevent the transistor from bottoming.

The circuit may also be used to perform so-called inhibit operations in which an output pulse is not produced when one or more inhibit inputs are applied to an OR gate 10, 11, or 12. The diode 13, 14 or 15 of an OR gate to which an inhibit input is to be applied is connected as above described through a resistor 56 to the —20 v. supply. Thus the OR gate is normally open but on the application of a positive going inhibit pulse the OR gate is closed, thereby preventing the opening of the AND gate and triggering of the transistor. An inhibiting input of this kind is indicated at F in FIGURE 3. A difficulty encountered is to ensure accurate blanking by the inhibit pulse during a digit period defined by the clock signal with consequent passing of spurious spike signals which causes false triggering of the transistor. This difficulty may be overcome by providing an additional input diode 54 to the AND gate, to which diode is applied a second clock signal from a source 55 designated CLOCK 2 leading in phase relative to the clock signal from source CLOCK 1, as indicated at G in FIGURE 3. The phase difference is so chosen that the AND gate is closed during the time period in which the spurious spike signals could otherwise be passed by the gate at the end of the inhibiting input. Thus, the AND gate output, as indicated at H in FIGURE 3, does not allow current to flow through diode 24 during the negative phase of CLOCK 1 signals.

In some configurations of interconnected pulse reshaper circuits, such as an inverse output from one brick and a normal output from a second brick connected to the input terminals of an input OR gate of a third brick, a false triggering of the transistor of the third brick may occur. This may be overcome by applying the clock signals which are applied to the first brick in parallel with the inverse output of this brick by means of a diode connected between the clock line and the inverse output terminal in the same sense as the diode 27.

The circuit may be modified to produce, instead of an output pulse extending over one digit period, an output pulse extending over a number of digit periods. The transformer 32 has a primary winding 31 of which the inductance is sufficiently large to maintain the positive feedback for the required number of digit periods whereby the transistor is maintained in a conducting state until cut off by a clock signal of appropriate mark to space ratio i.e. the clock signal is negative for the desired number of digit periods. Alternately the circuits may be operated in such a manner that the pulse output is initiated solely by the inputs to the OR gates 10, 11 or 12 and the pulse may be terminated by a single short pulse applied through the diode 27. This short pulse may if desired be a positive going pulse obtained from the appropriate output terminals of another similar basic unit.

The signal connections between basic units consisting of the circuit hereinbefore described are preferably in the form of matched two wire transmission lines. The input and output circuits of each unit are designed to match the characteristics of the interconnecting transmission line. This method of connection provides transmission of the signal with very little distortion and attenuation, also unwanted interaction between circuits is reduced to a minimum.

What is claimed is:

1. A pulse amplifying and reshaping circuit including a transistor having a base, an emitter and a collector electrode; a signal output transformer having a primary winding connected to the collector electrode and having a secondary winding; a source of timing pulses; means connected to the base electrode and operative in response to the absence of a timing pulse to prevent current flow to the collector electrode; signal gating means connected to the base electrode and operative to cause current flow to the collector electrode in response to application of at least one input signal to the signal gating means concurrent with one said timing pulse to produce a change of potential at the collector electrode and an output signal in the secondary winding; a resistance connected in series with the primary winding to limit the flow of current to the collector electrode; a voltage saturation device; switching means operative in response to a change of collector potential exceeding a predetermined value to connect the voltage saturation device across the primary winding to limit the signal output voltage to a predetermined level; and a positive signal feedback circuit connected between the secondary winding and the base electrode and operative to maintain flow of current to the collector electrode until termination of the timing pulse.

2. A circuit comprising a transistor having a base, an emitter and a collector cathode; a signal output transformer having a primary winding connected to the collector electrode and having a secondary winding; a diode connected to the base electrode; a source of timing pulses connected through the diode to the base electrode an AND gate having a plurality of inputs and having an output connected to the base electrode; a plurality of OR gates connected one to each input of the AND gate; a number of signal input lines connected to inputs of the OR gates; a positive signal feedback circuit connecting from the secondary winding to the base electrode; a current source connected through the primary winding to the collector electrode; a voltage saturable device and a further diode connected in series across the primary winding; and a voltage source connected to the junction of the further diode and the voltage saturable device to maintain the further normally diode non-conducting.

3. A pulse timing and shaping circuit including a transistor with base, collector and emitter electrodes; at least two sources of input pulses; a logical AND gating circuit comprising a group of similarly poled diodes, diodes of the group being respectively associated with different input pulse sources; means for applying first input pulses from a source to the associated diode, the diode being so poled that it is cut off in response to the pulses; means for biasing the diode associated with at least one other of said input pulse sources normally to be cut off; means for applying pulses from said one other source to the associated diode to cause it to conduct, an output diode connected between the AND gating circuit and the base electrode poled to allow current to flow to the base electrode to cause the transistor to conduct only if all the diodes of the group are cut off concurrently; a first timing pulse train source; a timing control diode connected between said first timing pulse train source and the base electrode poled to divert current from the base electrode except during the occurrence of a timing pulse of the first train; a second timing pulse train source, pulses in the second timing pulse train occurring in advance of corresponding pulses in said first timing pulse train; a further diode of the AND gating circuit group connected to said second source of timing pulses, said further diode being rendered conductive in response to timing pulses of said second timing pulse train to divert current from the output diode shortly after the commencement of a timing pulse in the first timing pulse train, an output load circuit including a transformer connected to the collector electrode to provide an output in response to conduction by the transformer; a feedback circuit comprising a further diode connected between the output load circuit and the base electrode poled to allow feedback current to flow to the base electrode in response to an output pulse, said feedback current being diverted from the base electrode at the end of a timing pulse by said timing control diode.

References Cited in the file of this patent

UNITED STATES PATENTS

| | | |
|---|---|---|
| 2,760,087 | Felker | Aug. 21, 1956 |
| 2,802,118 | Simkins | Aug. 6, 1957 |
| 2,827,566 | Lubkin | Mar. 18, 1958 |
| 2,918,587 | Rector | Dec. 22, 1959 |